Dec. 10, 1968 M. REICH 3,416,005

ISOLATION CIRCUITS FOR CODE CONVERTERS

Original Filed Jan. 20, 1964

INVENTOR
MARVIN REICH
BY
ATTORNEY

United States Patent Office 3,416,005

Patented Dec. 10, 1968

3,416,005

ISOLATION CIRCUITS FOR CODE CONVERTERS

Marvin Reich, 11741 College View Drive, Silver Spring, Md. 20902

Original application Jan. 20, 1964, Ser. No. 339,036, now Patent No. 3,327,301, dated June 20, 1967. Divided and this application June 28, 1966, Ser. No. 561,241

6 Claims. (Cl. 307—237)

ABSTRACT OF THE DISCLOSURE

The invention relates to circuits for coupling analog signals to the control electrodes of transistors which are utilized to control the operation of multivibrators.

The invention described herein may be manufactured and used by or for the Government of the United States of America for governmental purposes without the payment of any royalties thereon or therefor.

This is a division of application Ser. No. 339,036 filed Jan. 20, 1964, now Patent No. 3,327,301 patented June 20, 1967.

The invention is generally directed to analog coupling networks and more particularly to coupling network for coupling an analog signal to the control electrode of a variable impedance device.

For example, the desirability of coupling information bearing signals from one system into another has been established. Very briefly, such signals may be generated by a transducer having its own ground. The generated signal could be coupled to and utilized by a second processing system having the same or a different ground. If different ground exists, unwanted ground loops may be established between the transducer and the processing or utilizing systems.

The present invention eliminates difficulties introduced by the grounding of the circuits by providing a novel coupling network for coupling an analog signal control voltage from the generating transducer to the system to be controlled.

An object of the invention is to provide a coupling network for eliminating the effects of ground potentials associated with a signal.

Another object of the invention is to convert the reference point of an analog signal from a first reference point to a second reference point.

Still another object of the invention is to provide a means for coupling a control voltage to a device which is operating with floating potentials.

Other objects and many of the attendant advantages of this invention will be readily appreciated as the same becomes better understood by reference to the following detailed description when considered in connection with the accompanying drawings wherein.

Figures 1, 2:
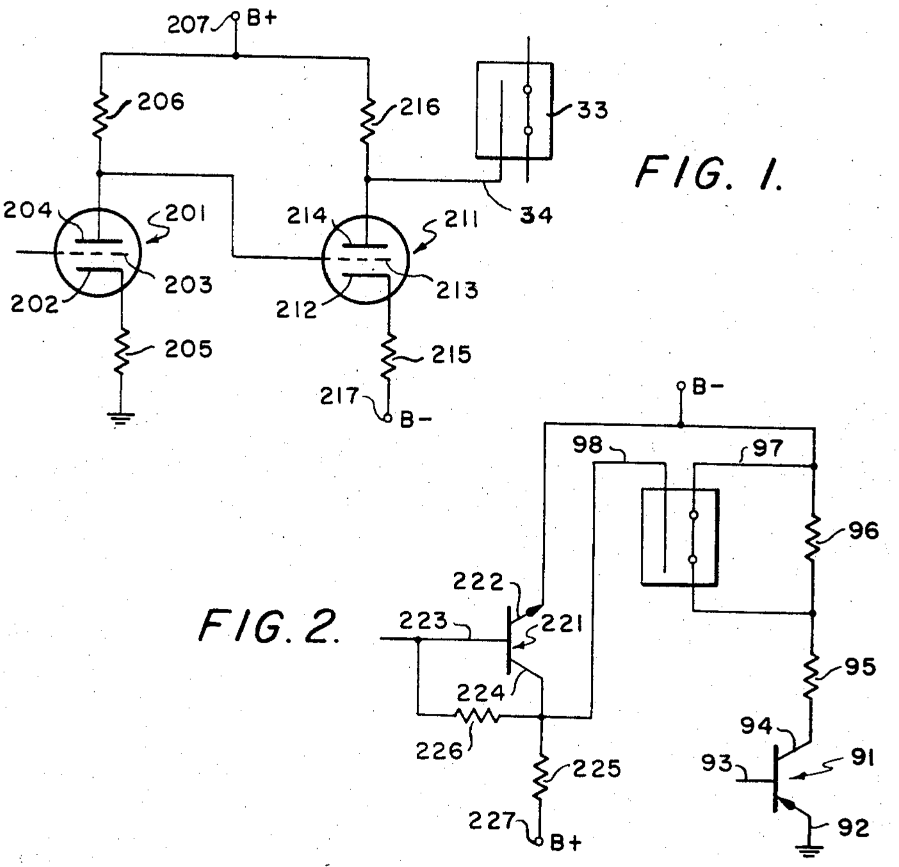
FIG. 1 is a circuit diagram of an isolation network in accordance with the present invention.
FIG. 2 is a circuit diagram of an alternate embodiment of an isolation network in accordance with the present invention.

In order to prevent interaction between the source of analog or control voltage and that of the voltages present in the multivibrator, suitable isolation circuits are provided in FIGS. 1, 2, and 3 to be hereinafter discussed in greater detail. Referring to the circuit of FIG. 1, such a circuit can be utilized, if necessary, to supply an analog voltage for the fieldistor 33 of FIG. 1 of applicant's copending application Ser. No. 339,036 filed Jan. 20, 1964, now Patent No. 3,327,301. To this end a first tube 201 having a cathode 202, a control grid 203 and a plate 204 is supplied with a first resistor 205 connected between the cathode 202 and ground and a second resistor 206 connected between the plate 204 and the source of B plus voltage 207. A second tube 213 is provided having a cathode 212, a control grid 213 and a plate 214. The control grid 213 is directly connected to the anode 204 of tube 210 and the cathode 212 of tube 211 is connected through a resistor 215 to a source of negative potential 217. The plate 214 of tube 211 is connected through resistor 216 to a source of positive potential 207 and the plate is further connected to the input terminal 34 of fieldistor 33. In operation the isolation network works as follows: a positive voltage supplied to the control grid 203 of tube 201 causes the tube 201 to become conductive thereby causing tube 211 which is normally conducting to become less conductive. Resistors 215 and 216 are so chosen as to place a negative potential on the input of fieldistor 34 when tube 211 is in its high conductive state. As conductivity of tube 211 becomes less and less its output which is connected to point 34 becomes more and more positive by reducing the flow of current through the tube 211. When the tube 211 becomes finally completely cut off, then the potential on the input lead 34 will eventually approach the positive potential of point 207.

FIG. 2 discloses an alternative embodiment of an isolation network utilizable in FIG. 4 of applicant's copending application Ser. No. 339,036 now Patent No. 3,327,-301. In this embodiment a first PNP type transistor 211 having an emitter electrode 222, a base electrode 223, and a collector electrode 224 is provided. The emitter electrode 222 is directly connected to the source of B minus potential. The collector electrode 224 is coupled through a resistor 225 to a source of B plus potential 227. A biasing resistor 226 is connected between the base electrode 223 and the collector electrode 224. The input electrode terminal 98 of fieldistor 97 is connected to the collector electrode 224 of transistor 221. In operation, the transistor 221 is normally conductive supplying a negative potential to the input terminal 98 of fieldistor 97, thereby holding fieldistor 97 in its high resistivity condition. However, upon applying a negative potential to the input electrode 223, transistor 221 becomes less and less conductive thereby gradually supplying a positive potential which is directly related to the negative input potential to the input terminal 98 of fieldistor 97, thereby causing the fieldistor to become more and more conductive and place a smaller voltage across element 96.

Figure 3:
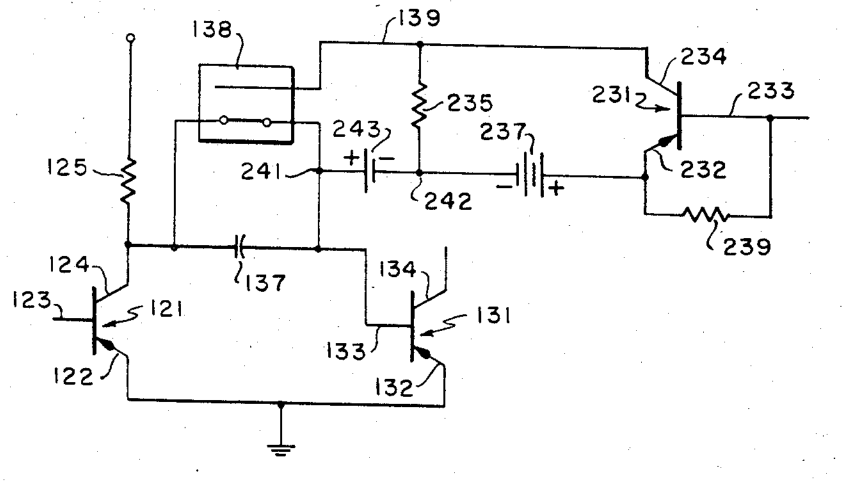
FIG. 3 is a circuit diagram of still another alternate embodiment of an isolation network in accordance with the present invention.

The isolation network shown in FIG. 3 is suitable for use in the circuits of FIG. 3, FIG. 5 and FIG. 6 of applicant's copending application Ser. No. 339,036 filed January 20, 1964, now Patent No. 3,327,301. By way of example, a first transistor 231 having an emitter electrode 232, a base electrode 233 and a collector electrode 234 is provided with a resistor 239 connected between the emitter electrode 232 and the base electrode 233. A source of potential 237 has its positive terminals connected to the emitter electrode 232 of transistor 231. The negative terminal of the battery is connected to the junction point 242 of the fieldistor circuit 138. A resistor 235 is connected between the negative terminal of battery 237 and the collector electrode 234 of transistor 231. The collector electrode 234 of transistor 231 is further connected to the input terminal 139 of fieldistor 138. A small cut off bias battery 243 is provided with terminals 241 and 242 to provide a negative potential on terminal 139 of fieldistor 138 in the absence of an input signal on the base 233 of transistor 231. However, if the resistance of the fieldistor is otherwise sufficient, the battery 243 may be eliminated. Upon applying a negative going signal on the base of transistor 231, the collector 234 of transistor 231 becomes more positive and its potential is directly related to the potential on its base, thereby placing a positive potential on terminal 139 of fieldistor 138. As the input signal on the base 233 becomes greater than the conductivity of fieldistor 138 increases. In this manner the analog input signal on the base electrode 233 is directly related to the resistivity of the fieldistor 138.

Obviously many modifications and variations of the present invention are possible in the light of the above teachings. It is therefore to be understood that within the scope of the appended claims the invention may be practiced otherwise than as specifically described.

What is claimed is:

1. An isolation network for coupling an analog voltage signal from an analog signal source to an analog-to-pulse encoder comprising:

a first and second electronic valve having an input electrode, control electrode and output electrode;

an analog signal coupled to the control electrode of said first electronic valve;

a point of ground potential coupled to said input electrode of said first electronic valve;

said output electrode of said first electronic valve coupled to the control electrode of said second electronic valve;

a fieldistor having its input terminal connected to the output electrode of said second electronic valve;

said fieldistor having a first terminal and a second terminal, an impedance having two ends, said first fieldistor terminal connected to one end of said impedance and said second fieldistor terminal connected to the other of said impedance; and a source of negative potential coupled to said input electrode of said second electronic valve whereby the input of said fieldistor is isolated from the ground point utilized in said analog signal source.

2. An isolation circuit as defined in claim 1 but further characterized by said first and second electronic valve being electronic tubes each having a cathode input electrode, a control grid and a plate output electrode.

3. An isolation network for coupling an analog voltage signal from the output of an analog signal source to an analog to pulse encoder comprising:

a first and second electronic valve each having a control electrode and an output electrode;

a first capacitive network, said first capacitive network coupling the output electrode of said first electronic valve to the control electrode of said second electronic valve;

an analog signal coupled to the control electrode of said first electronic valve;

a source of B minus potential;

a fieldistor having an input terminal and a first terminal and a second terminal, said first terminal coupled to the source of B minus potential and its second terminal coupled to the output electrode of said first electronic valve; and a third electronic valve having a control electrode, an input electrode and an output electrode, the input of said third electronic valve coupled to said source of B minus potential;

said output electrode of said third electronic valve coupled to said input terminal of said fieldistor and said output of said analog signal source coupled to the control electrode of said third electronic valve.

4. An isolation circuit as defined in claim 3 but further characterized by having said first, second and third electronic valves each comprising a transistor.

5. An isolation network for coupling an analog voltage signal to the input terminal of a fieldistor having an input terminal, a first terminal and second terminal, a capacitive cross coupling network having two ends, said first terminal connected on one end of said capacitive cross coupling network and said second terminal connected on the other end of said capacitive cross coupling network;

said isolation network comprising: a first transistor having an emitter electrode, base electrode, and collector electrode;

a source of voltage having a first and second polarity, said first polarity connected to said first terminal of said fieldistor and said second polarity connected to said emitter electrode of said transistor;

said collector electrode of said transistor coupled to the input electrode of said fieldistor;

said analog voltage signal coupled to the base electrode of said transistor.

6. An isolation network for coupling an analog voltage signal to the input of a fieldistor having an input electrode, a first and second terminal, a capacitive cross coupling network having a first end and second end, said first terminal connected to the first end of said capacitive cross coupling network and said second terminal coupled to said second end of said capacitive cross coupling network;

said isolation network comprising: a first electronic valve having a control electrode, and an output electrode; and said output electrode of said electronic valve coupled to the input electrode of said fieldistor;

said analog voltage signal coupled to the input electrode of said electronic valve.

References Cited

UNITED STATES PATENTS 3,255,364 6/1966 Warner ............ 307—88.5

ARTHUR GAUSS, *Primary Examiner.*

S. D. MILLER, *Assistant Examiner.*

U.S. Cl. X.R.

307—229, 261, 272, 304; 328—162